(12) United States Patent
Louie et al.

(10) Patent No.: US 9,511,519 B2
(45) Date of Patent: Dec. 6, 2016

(54) SYSTEM AND METHOD OF VACUUM BAGGING COMPOSITE PARTS (71) Applicant: The Boeing Company, Chicago, IL (US)

(72) Inventors: Michael Louie, Renton, WA (US); Kenneth Dull, Puyallup, WA (US); Timothy Aquino, Olympia, WA (US)

(73) Assignee: The Boeing Company, Chicago, IL (US)

( * ) Notice: Subject to any disclaimer, the term of this patent is extended or adjusted under 35 U.S.C. 154(b) by 410 days.

(21) Appl. No.: 14/172,305

(22) Filed: Feb. 4, 2014

(65) Prior Publication Data

US 2015/0217487 A1    Aug. 6, 2015

(51) Int. Cl.
| B32B 37/10 | (2006.01) |
| B29C 43/12 | (2006.01) |
| B29C 70/34 | (2006.01) |
| B32B 5/02 | (2006.01) |
| B29C 65/00 | (2006.01) |
| B32B 5/00 | (2006.01) |
| B29C 70/44 | (2006.01) |
| B29C 70/54 | (2006.01) |

(Continued)

(52) U.S. Cl.
CPC .......... *B29C 43/12* (2013.01); *B29C 66/00145* (2013.01); *B29C 66/81455* (2013.01); *B29C 70/34* (2013.01); *B29C 70/342* (2013.01); *B29C 70/44* (2013.01); *B29C 70/54* (2013.01); *B32B 5/00* (2013.01); *B32B 5/02* (2013.01); *B32B 37/10* (2013.01); *B32B 37/1009* (2013.01); *B32B 37/1018* (2013.01); *B29K 2101/00* (2013.01); *B29K 2313/02* (2013.01); *B29L 2009/00* (2013.01); *Y10T 428/1334* (2015.01); *Y10T 428/1362* (2015.01)

(58) Field of Classification Search
CPC .......... B29C 43/12; B29C 70/54; B29C 70/34; B29C 70/342; B29C 70/44; B29C 66/00145; B29C 66/81455; B32B 5/00; B32B 5/02; B32B 37/10; B32B 37/1009; B32B 37/1018; Y10T 428/1362
USPC .................................................. 156/285, 286
See application file for complete search history.

(56) References Cited

U.S. PATENT DOCUMENTS

| 8,192,574 B1 | 6/2012 | Boone | |
| 2005/0086916 A1* | 4/2005 | Caron | ..................... B29C 43/12 55/382 |
| 2006/0017200 A1 | 1/2006 | Cundiff et al. | |

(Continued)

OTHER PUBLICATIONS

Extended European Search Report, EP 15152862, dated Jun. 5, 2015.

(Continued)

*Primary Examiner* — Walter B Aughenbaugh (57) ABSTRACT

A vacuum bag assembly may include a bagging film and a tube bag. The bagging film may have a bagging film length and may be positioned over a composite layup and sealed to a tool surface having an inside corner. The tube bag may have opposing tube ends and a tube bag length and may be positioned over the composite layup along a length of the inside corner. Each one of the tube ends may be sealed to the tool surface along a first portion of a tube end perimeter edge and may be sealed to the bagging film along a second portion of the tube end perimeter edge such that each one of the tube ends is openable to atmosphere.

20 Claims, 10 Drawing Sheets

(51) Int. Cl.
B29K 101/00 (2006.01)
B29L 9/00 (2006.01)

(56) References Cited

U.S. PATENT DOCUMENTS

2013/0097854 A1 4/2013 Kato et al.

OTHER PUBLICATIONS

Canadian Office Action for Application No. 2,876,784, dated Mar. 10, 2016.

* cited by examiner

SYSTEM AND METHOD OF VACUUM BAGGING COMPOSITE PARTS

FIELD

The present disclosure relates generally to processing of composite layup and, more particularly, to a method of vacuum bagging composite parts of complex curvature.

BACKGROUND

Composite materials are used in a wide variety of applications. In aircraft construction, composites are used in increasing quantities to form the fuselage, wings, tail section, and other components. During the forming of composite structures, composite plies may be laid up on a tool having the shape of the final composite part. Heat and/or pressure may be applied to the composite plies to cure or solidify resin material in the composite plies. Compactive pressure may be applied to the composite layup by covering the layup with a vacuum bag, sealing the vacuum bag to the tool, and drawing a vacuum on the vacuum bag. Additional pressure may be applied by placing the bagged layup into an autoclave. The compactive pressure of the vacuum bag may force the composite plies against the tool surfaces during cure such that the final composite part assumes the shape of the tool. The compactive pressure may also consolidate the composite plies and assist in removing excess resin which may increase the fiber-volume fraction and thereby increase the specific strength of the final composite part. In addition, the application of compactive pressure may assist in removing volatiles (e.g., gasses) and/or moisture generated during the heating and curing of the resin and may also assist in preventing voids in the final composite part.

For tool surfaces that include inside corners or female radii, the vacuum bagging process may require the forming of pleats of excess material in the vacuum bag at locations where the vacuum bag compresses the inside corners of the composite layup. Pleats may be hand-formed by folding the vacuum bag material over onto itself and sealing together the overlapped material at the edges of the vacuum bag. The formation of pleats allows for localized slippage of the vacuum bag in the region of the inside corner as the composite layup shrinks in thickness under the force of the compactive pressure. Pleats are typically necessary to prevent bridging of the vacuum bag and composite plies in the region of the inside corners. Such bridging may result in a reduction in consolidation of the composite plies, and may result in the inside corners having excess resin and an increased risk of voids or porosity in the final composite part.

Unfortunately, the forming of pleats in a vacuum bag is a time-consuming and labor-intensive process requiring a significant amount of touch labor. In this regard, each pleat must be hand-formed in a meticulous manner and must be adjusted such that the pleat is aligned with the length of the inside corner. Each pleat may also represent a possible leak path into the vacuum bag which may compromise the integrity and robustness of the vacuum bagging process.

As can be seen, there exists a need in the art for a system and method for vacuum bagging a composite layup in a manner that allows for the application of compactive pressure in inside corners of a composite layup and which can be implemented in a reduced amount of time and with a reduced amount of touch labor and which has a high degree of robustness.

SUMMARY

The above-noted needs associated with vacuum bagging of composite layups are addressed by the present disclosure which provides a vacuum bag assembly including a bagging film and a tube bag. The bagging film may have a bagging film length and may be positioned over a composite layup and sealed to a tool surface having an inside corner. The tube bag may have opposing tube ends and a tube bag length and may be positioned over the composite layup along a length of the inside corner. Each one of the tube ends may be sealed to the tool surface along a first portion of a tube end perimeter edge, and may be sealed to the bagging film along a second portion of the tube end perimeter edge such that each one of the tube ends is openable to atmosphere.

In a further embodiment, disclosed is a bagging system for vacuum bagging a composite layup. The bagging system may include vacuum bag assembly applied to a tool having tool surfaces and an inside corner. The vacuum bag assembly may include a bagging film and a tube bag. The bagging film may have a bagging film length and may be positioned over a composite layup and sealed to the tool surfaces. The tube bag may have opposing tube ends and a tube bag length and may be positioned over the composite layup along a length of the inside corner. Each one of the tube ends may be sealed to the tool surface along a first portion of a tube end perimeter edge and may be sealed to the bagging film along a second portion of the tube end perimeter edge such that each one of the tube ends is openable to atmosphere.

Also disclosed is a method of vacuum bagging a composite layup. The method may include applying a tube bag over a composite layup along a length of an inside corner. The method may additionally include sealing each one of opposing tube ends to a tool surface by sealing a first portion of a tube end perimeter edge to the tool surface. The method may also include applying a bagging film over the composite layup and over the tube bag. In addition, the method may include sealing the bagging film to the tool surface and to each one of the tube ends along a second portion of the tube end perimeter edges such that each one of the tube ends is open to atmosphere and/or autoclave pressure.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
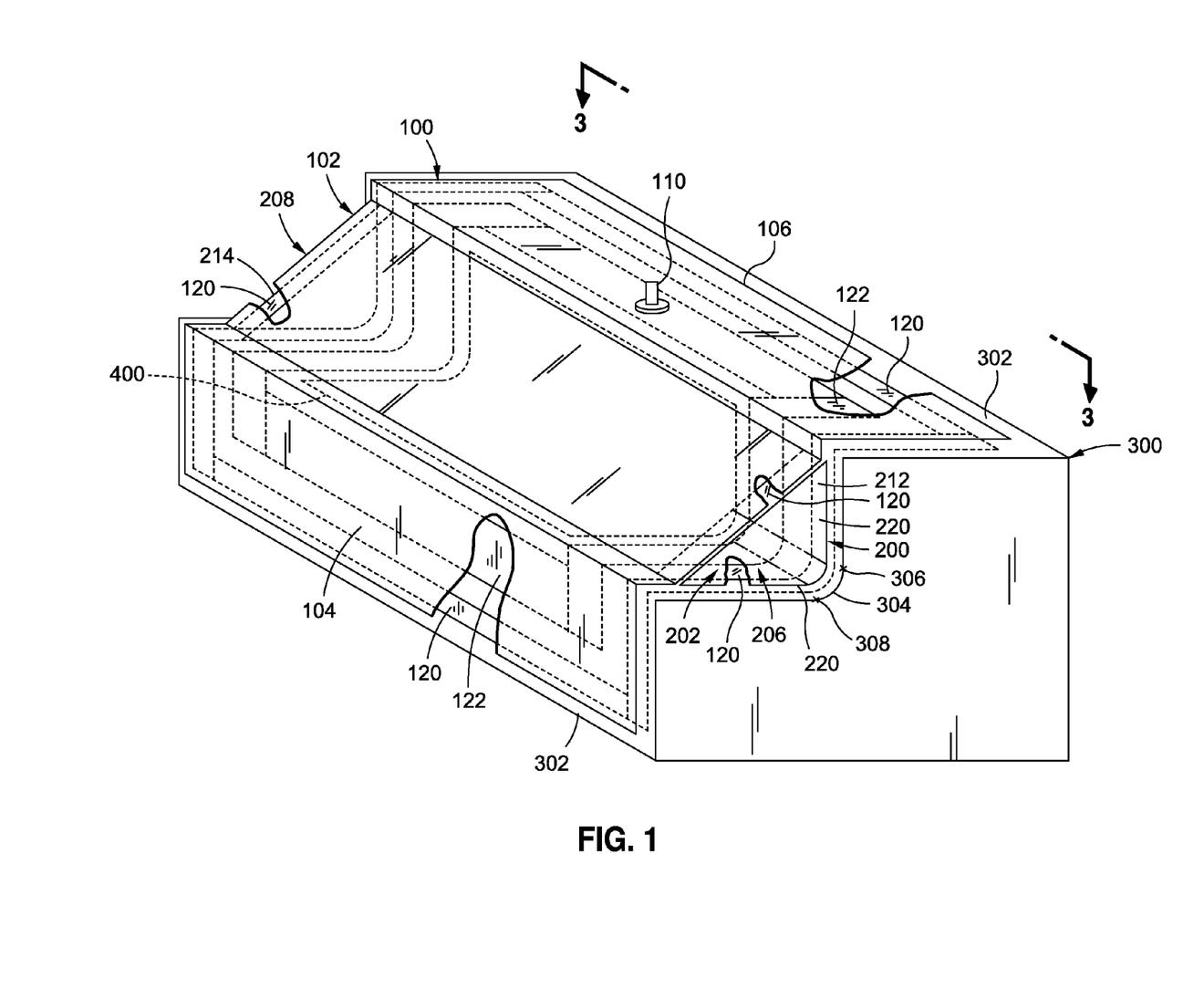
FIG. 1 is perspective illustration of an embodiment of a vacuum bagging system including a hollow tube bag assembled to a bagging film and applied over a composite layup and sealed to a tool.
Figures 17, 18:
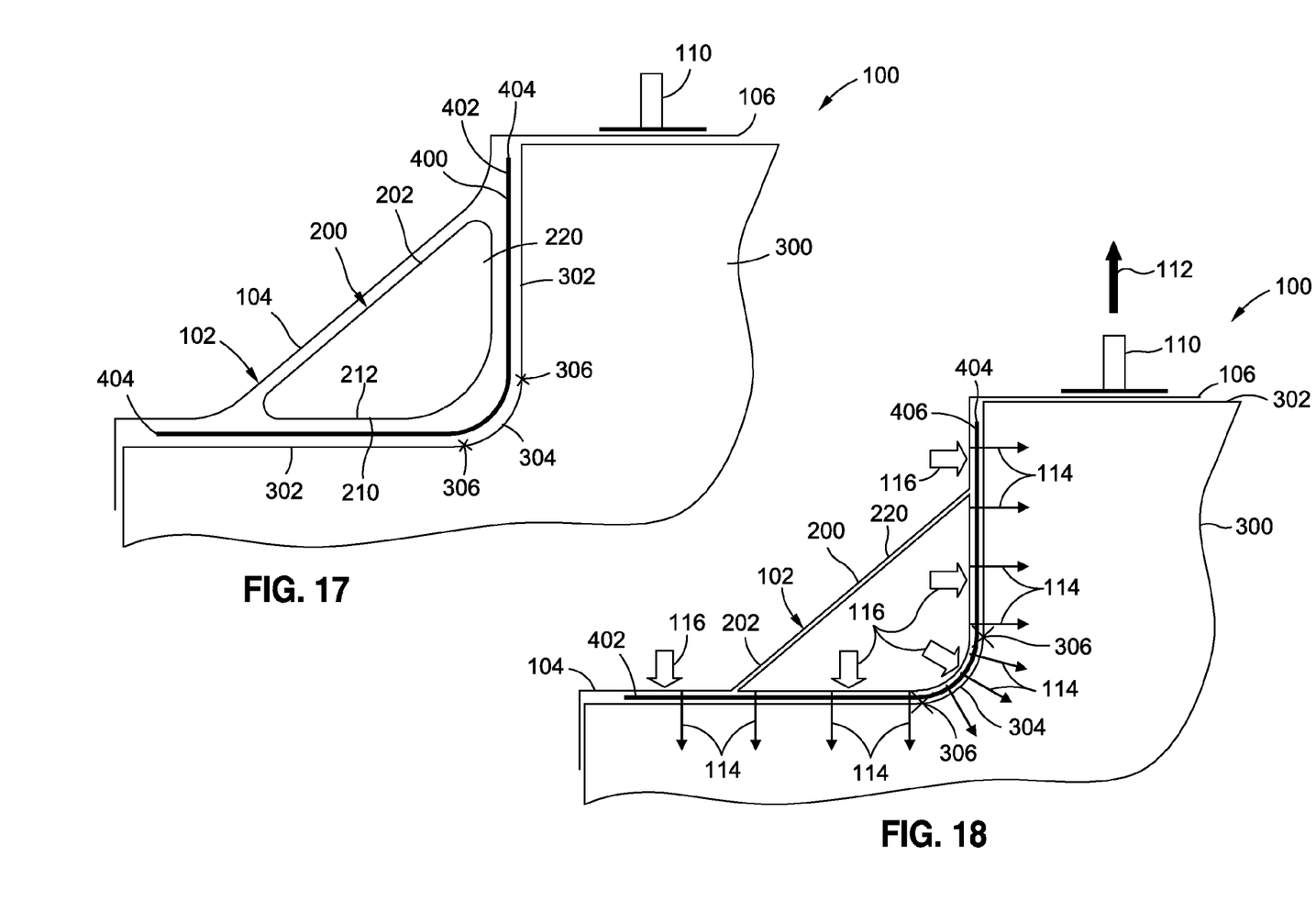
FIG. 17 is a sectional view of the bagging system taken along line 17 of FIG. 16 and illustrating the hollow tube bag disposed against the composite layup prior to the drawing of vacuum pressure on the vacuum bag assembly.
FIG. 18 is a sectional view of the bagging system during the application of vacuum pressure and autoclave pressure on the vacuum bag assembly.

Referring now to the drawings wherein the showings are for purposes of illustrating preferred and various embodiments of the disclosure, shown in FIG. 1 is a perspective illustration of an embodiment of a vacuum bag assembly 102 including a hollow tube bag 200 assembled with a bagging film 104 and applied over a composite layup 400 and sealed to a tool 300. Advantageously, the tube bag 200 may be used in the vacuum bagging of a composite layup 400 to apply uniform compactive pressure to at least the inside corner 304 region of the composite layup 400. In this regard, the tube bag 200 has opposing tube ends 208 that are open. Each one of the tube ends 208 may be sealed to the bagging film 104 such as to the bagging film perimeter edge 106, and sealed to the tool surfaces 302 in a manner such that the tube ends 208 are each open to ambient atmosphere and/or to autoclave pressure 116 (FIG. 18). The tube bag portion between the tube ends 208 may move or slip freely in a lateral direction over the composite layup 400 allowing the tube bag 200 to conform to the shape of the inside corner 304. In this manner, uniform compactive pressure 114 may be applied by the tube bag 200 on the inside corner 304 of the composite layup 400 in the same manner in which compactive pressure 114 is applied by the bagging film 104 onto other portions of the composite layup 400.

Referring to FIG. 1, shown is an example of a vacuum bag system applied to a tool 300 having an inside corner 304. The inside corner 304 is shown as a single radius at a juncture of two generally planar tool surfaces 302. In addition, the inside corner 304 is shown as having a generally constant radius along the length of the inside corner 304. However, the inside corner 304 may be formed in any size, shape, and configuration, without limitation. For example, the inside corner 304 may be formed in a non-radiused cross-sectional shape. For example, the inside corner 304 may have an irregular shape or increasing-radius or a decreasing-radius cross-sectional shape. In addition, the inside corner 304 may be located between two non-planar surfaces or between a planar surface and a non-planar surface. Furthermore, the inside corner 304 may have a variable curvature that may change in size and/or shape along the length of the inside corner 304. In the present disclosure, the term inside corner may be described as any concave feature or female radius formed in a tool surface, and is not limited to the example of the inside corner 304 illustrated in the figures.

In FIG. 1, when the vacuum bag assembly is installed on the tool 300, the tube bag 200 assembly may have a hollow shape. In the embodiment, shown, the tube bag 200 has a generally triangular cross-sectional shape. The diagonal of the triangular cross-sectional shape includes the tube bag 200 which is overlapped by the bagging film 104. However, the tube bag 200 and overlapping bagging film 104 may assume a generally hollow L-shaped cross-section (not shown) generally approximating the cross-sectional shape of the inside corner 304. The vacuum bagging system 100 may have a vacuum port 110 installed in at least one location on the bagging film 104. The vacuum port 110 may be coupled to a vacuum source (not shown) for drawing a vacuum on the bagging film 104 and tube bag 200. In an embodiment, the bagging film 104 and the tube bag 200 may each be sealed to the tool 300. For example, as described in greater detail below, sealant tape 120 may be used to seal the bagging film 104 and the tube bag 200 to the tool surfaces 302. However, other types of sealing mechanisms may be used to seal the bagging film 104 and the tube bag 200 to the tool 300.

Figure 2:
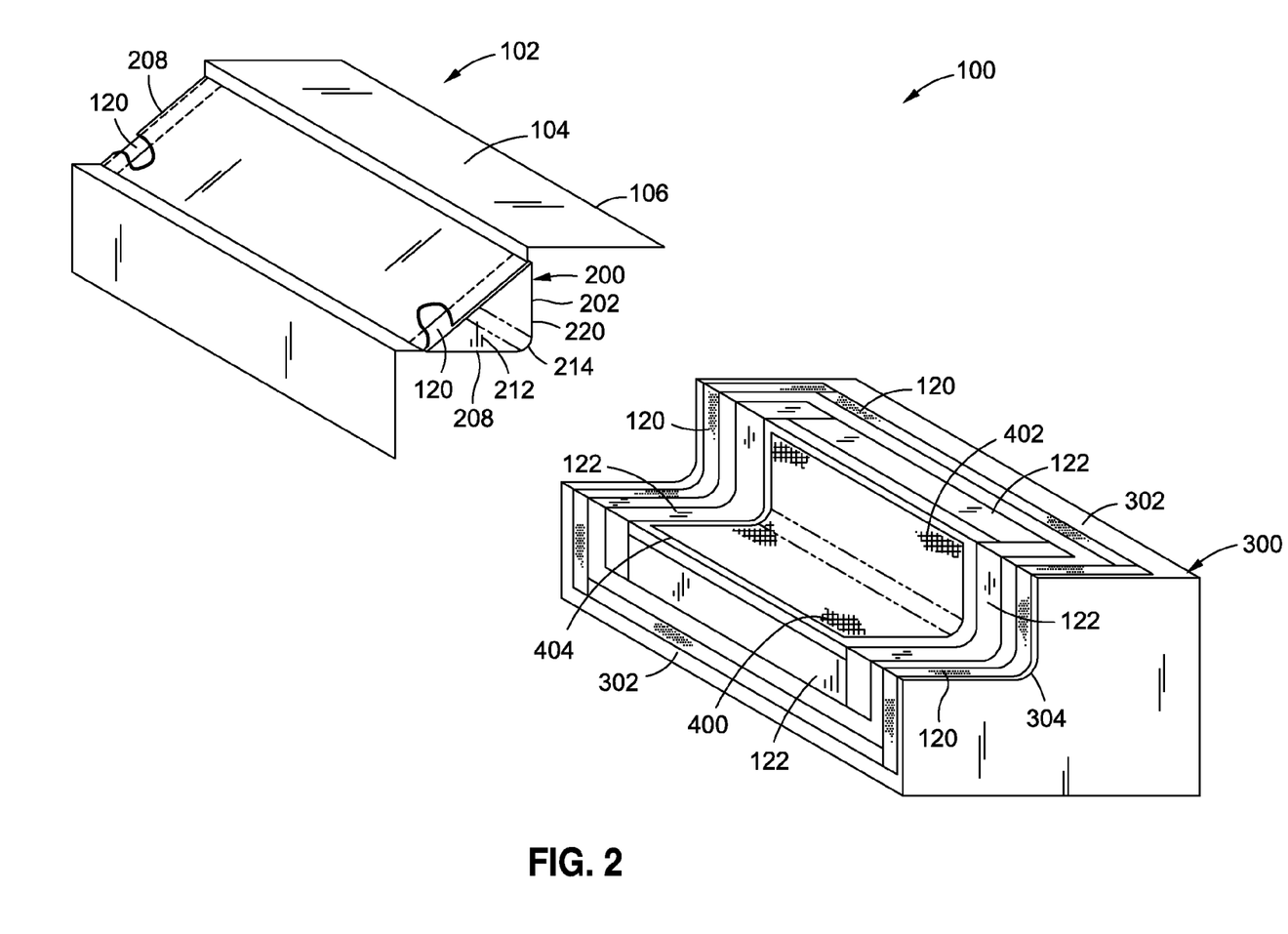
FIG. 2 is an exploded perspective illustration of the vacuum bagging system illustrating the tube bag assembled to the bagging film.

Referring to FIG. 2, shown is the vacuum bagging system 100 illustrating the hollow tube bag 200 assembled to the bagging film 104. The tube bag 200 may be formed of a relatively flexible material similar to the material from which the bagging film 104 is formed. In this regard, the tube bag 200 may droop under the force of gravity when removed from the tool 300 and therefore may not have a generally triangular cross-sectional shape when removed from the tool 300. FIG. 2 illustrates the composite layup 400 applied to the tool surface 302. An optional release liner may be applied to the tool surface 302 prior to laying up the composite layup 400. Edge breather 122 strips may be applied to the tool surfaces 302 around perimeter edges 404 of the composite layup 400. In addition, sealant tape 120 or other sealing mechanisms may be used to seal the bagging film 104 and the tube bag 200 to the tool 300.

The bagging system 100 disclosed herein may be implemented for vacuum bagging any type of material, without limitation, including a composite layup 400 comprised of one or more composite plies 402. The composite plies 402 may include plies of fiber-reinforced polymer matrix material such as thermoplastic or thermosetting fiber-reinforced matrix material. The fiber-reinforced matrix material may include reinforcing fibers formed of graphite, glass, Kevlar™, ceramic, metallic, and/or other material. In some examples, the composite plies 402 may be plies of pre-impregnated fiber-reinforced polymer matrix material (i.e., prepreg). The composite plies 402 may be comprised of woven material, unidirectional tape, or may include chopped fibers, short fibers, random fibers, or any other type of fiber orientation. In a further embodiment not shown, the composite plies 402 may be provided as dry fibrous material which may be later infused with wet resin using any one of a variety of different resin infusion methods including, but not limited to, resin film infusion (RFI), vacuum assisted resin transfer molding (VARTM), and any other type of resin infusion or resin draw process.

Figure 3:
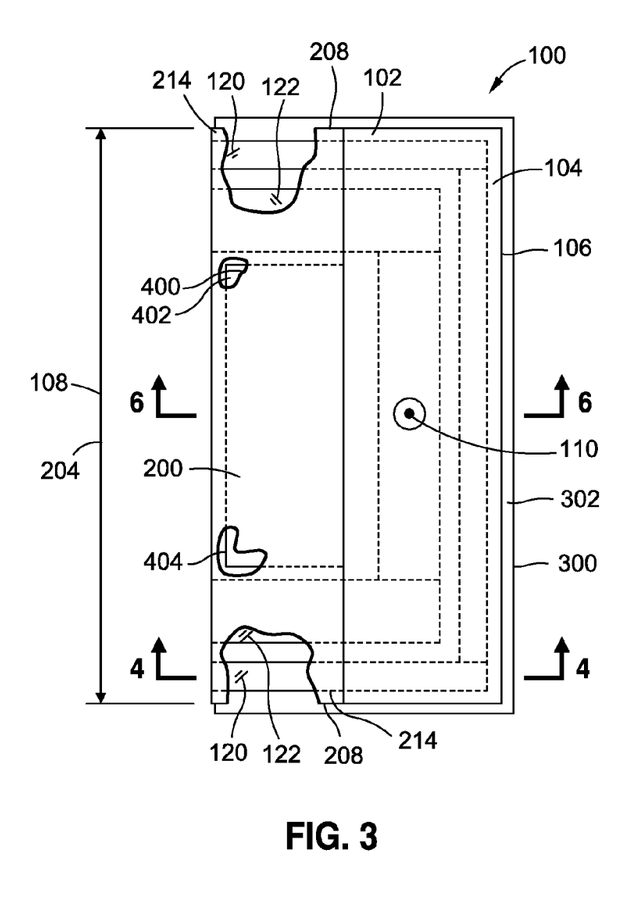
FIG. 3 is a top view of the bagging system applied to a tool.

In FIG. 3, the bagging film 104 may have a bagging film length 108 and may be configured to be positioned over the composite layup 400 and sealed to one or more tool surfaces 302. In this regard, the bagging film length 108 may described as extending along a direction of the length of the inside corner 304. The tube bag 200 may comprise a bag body 202 having opposing tube ends 208 and a tube bag length 204 and may be configured to be positioned over the composite layup 400 along the length of the inside corner 304. The tube bag 200 may have a tube bag length 204 such that at least one of the tube ends 208 extends beyond a perimeter edge 404 of the composite layup 400. In addition, one or both of the tube ends 208 may extend beyond the location where the tube bag 200 is sealed to the tool surface 302. The tube bag length 204 may be at least as long as the inside corner 304. In some examples, the tube bag length 204 may be at least as long as the bagging film length 108. As indicated earlier, the opposing tube ends 208 may be sealed to the tool 300.

Figure 4:
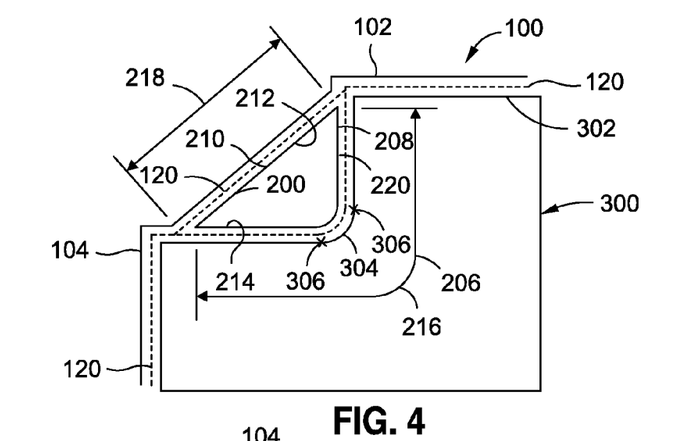
FIG. 4 is a sectional view of the bagging system taken along line 4 of FIG. 3 and illustrating a first portion of a tube end perimeter edge of the tube bag sealed to the bagging film and a second portion of the tube end perimeter edge sealed to the tool surfaces.

In FIG. 4, shown is cross-sectional view of an end of the bagging system 100 sealed to the tool 300 in a manner such that the tube end 208 is opened to ambient atmosphere and/or to autoclave pressure 116. In this regard, each one of the tube ends 208 includes a tube end perimeter edge 214 extending around an outer surface 210 of the tube bag 200. A first portion 216 of the tube end perimeter edge 214 may be sealed to the bagging film 104. A second (i.e., remaining) portion of the tube end perimeter edge 214 may be sealed to the tool surface 302. The bagging film 104 may be sized such that when the second portion 218 of the tube end perimeter edge 214 is sealed to the tool 300, the bagging film 104 has sufficient width to span the length of the diagonal of the first portion 216 of the tube end perimeter edge 214 and such that the bagging film 104 may further overlap and may be sealed to the tool surfaces 302. For example, FIG. 4 illustrates a horizontal leg of the bagging film 104 extending beyond the tube bag 200 and sealed to the upper-most horizontal tool surface 302 and a vertical leg of the bagging film 104 extending beyond an opposite side of the tube bag width 206 and sealed to the left-most vertical tool surface 302. Advantageously, the bagging film 104 may be substantially devoid of pleats which may significantly reduce the complexity and time required to assemble and install the vacuum bag assembly 102, and may increase the robustness and sealing reliability of the bagging system 100 relative to conventional vacuum bags.

Figure 5:
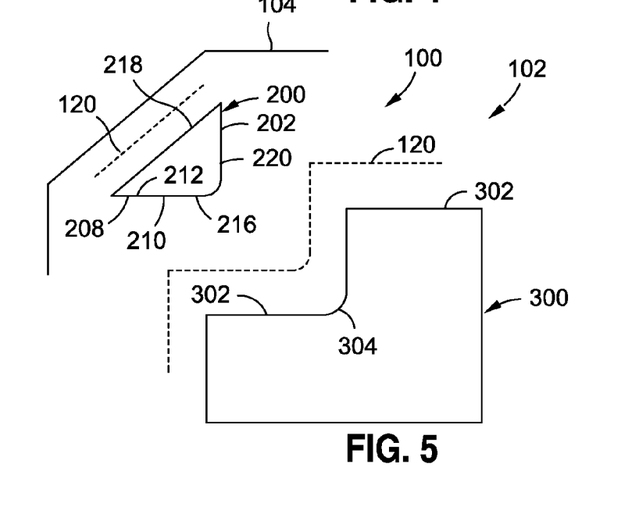
FIG. 5 is an exploded view of the bagging system of FIG. 4.

FIG. 5 shows an exploded view of a tube end 208, the bagging film 104, the tool 300, and the sealant tape 120 that may be used for sealing the components together. In an embodiment, the tube bag 200 may be formed as a separate component from the bagging film 104 and may be sealed to the bagging film 104 after the tube bag 200 is formed. The tube bag 200 may have a closed cross-section 220 as indicated above. The bagging film 104 and/or the tube bag 200 may be formed of non-breathable and/or non-perforated polymeric film or sheet or other durable material capable of sealing the composite layup 400 to the tool 300. In some examples, the bagging film 104 and the tube bag 200 may be formed of the same material. The bagging film 104 and/or the tube bag 200 may be formed of polyamide film such as Nylon™ However, the bagging film 104 and/or the tube bag 200 may be formed of Kapton™, or other non-breathable or non-perforated polymeric film or sheet.

Referring still to FIG. 5, in some examples, the first portion 216 of the tube end perimeter edge 214 of each tube end 208 may be sealed to the bagging film 104 using sealant tape 120 or other sealing mechanism. The second (i.e., remaining) portion of the tube end perimeter edge 214 may be sealed to the tool 300 also using sealant tape 120 or other sealing mechanism. The sealant tape 120 may comprise a conformable, tacky, putty-like material for removably adhering the tube bag 200 and the bagging film 104 to the tool surfaces 302, and for removably adhering the tube bag 200 to the bagging film 104. In this regard, the sealant tape 120 may comprise a rubber-based adhesive tape that is generally tacky and that may be used to form an airtight seal between the bagging film 104 and the tool surfaces 302 and between the tube bag 200 and the tool surfaces 302. The sealant tape 120 may be provided in a composition that is generally soft and pliable during room-temperature installation of the vacuum bag assembly 102, and at elevated temperatures associated with processing (e.g., curing or solidifying) the composite layup 400.

It should be noted that the sealing of the vacuum bag assembly 102 to the tool 300 is not limited to the use of sealant tape 120, and may include any type of mechanism for sealing the bagging film 104 and the tube bag 200 to the tool surfaces 302. For example, in some embodiments, the bagging film 104 and/or the tube bag 200 may be sealed to the tool surfaces 302 using a mechanical sealing mechanism (not shown) or by using a chemical sealing process (not shown), or a combination thereof, and is not limited to the use of sealant tape 120 for sealing the components together. In some embodiments, the tube bag 200 may be thermally bonded or heat-sealed to the bagging film 104 at least along the second portion 218 of the tube end perimeter edge 214.

Figure 6:
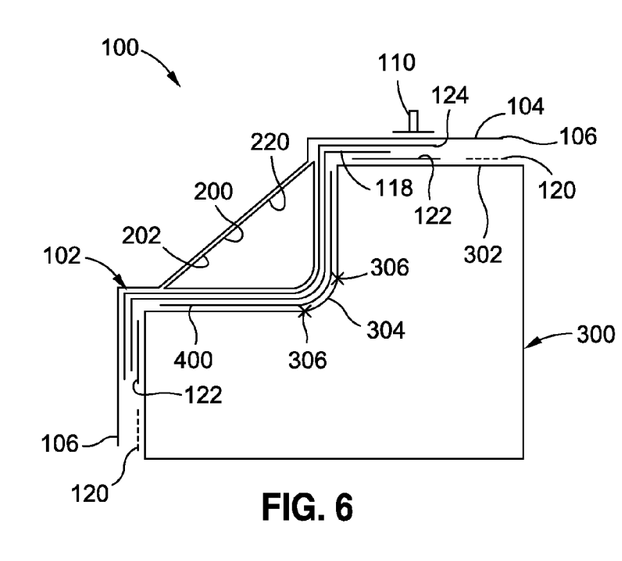
FIG. 6 is a sectional view of the bagging system taken along line 6 of FIG. 3 illustrating the tube bag and bagging film applied over a composite layup at a location approximately midway between the tube ends.

FIG. 6 is a sectional view of the bagging system 100 taken at a location approximately midway between the tube ends 208. The tube bag 200 may be sized and configured to provide compactive pressure 114 on inside corners 304 having a radius as small as one-half inch or smaller. In some examples, the tube bag 200 may have a radius of six (6) inches or less, assuming a circular cross-sectional of the tube bag 200. However, the tube bag 200 may be configured such that the tube bag 200 has a radius of greater than six (6) inches, assuming a circular cross-sectional of the tube bag 200. The tube bag 200 may be provided in a tube bag width 206 (FIG. 4) that allows the tube bag 200 material to extend past one or both tangents 306 of the inside corner 304. In this regard, the tube bag 200 may have a tube bag width 206 such that when a vacuum is drawn on the bagging film 104, the tube bag width 206 extends beyond at least one tangent 306 of the inside corner 304 for at least one location along a length of the inside corner 304. In the present disclosure, the tube bag width 206 may be described as the combined width of the tube bag 200 material that is directly facing the composite layup 400, and may be measured in a manner similar to the second portion 218 of the tube end perimeter edge 214 as shown in FIG. 4.

Figure 7:
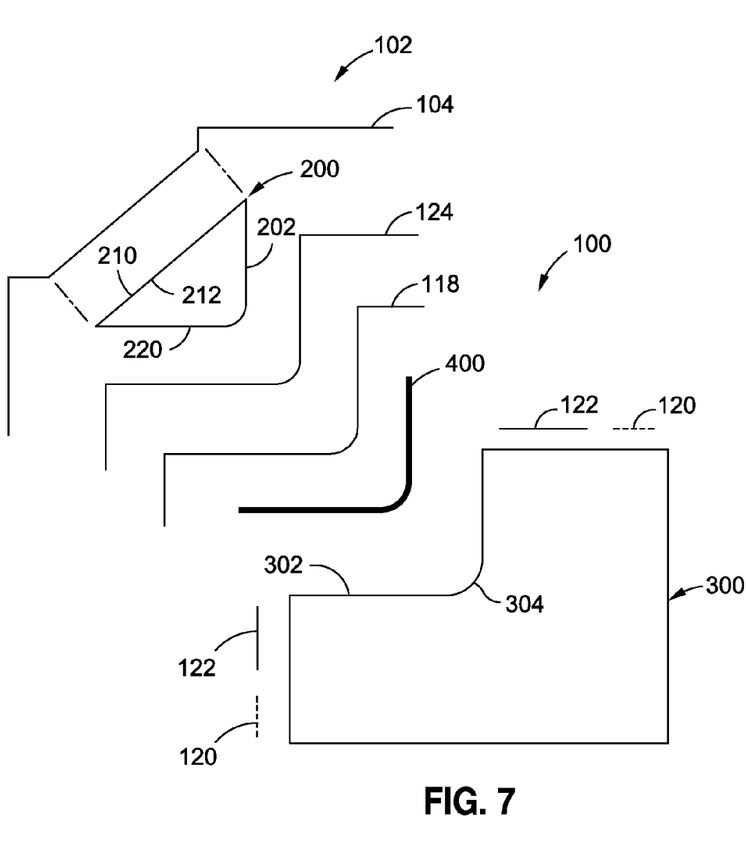
FIG. 7 is an exploded view of the bagging system of FIG. 6.

In FIG. 7, shown is an exploded sectional view of the bagging system 100 and showing the sealant tape 120 applied to the tool surfaces 302 for sealing the bagging film 104 to the tool 300. Also shown are edge breather 122 strips that may be positioned along the perimeter edges of the composite layup 400. In addition, the bagging system 100 may include a surface breather 124 layer which may be formed of fibrous material and applied over the composite layup 400 to maintain a pathway for the escape of air and volatiles from the vacuum bag to the vacuum port 110. A release film 118 formed of porous (e.g., perforated) or non-porous material such as fluorinated ethylene propylene (FEP) may be sandwiched between the composite layup 400 and the surface breather 124 for resin bleed from the composite layup 400 during heating and/or curing. In addition to the edge breather 122, surface breather 124, and release film 118, additional layers may be included such as to control resin bleed or for other purposes.

Referring to FIG. 7, the tube bag 200 may be unattached to the bagging film 104 at locations between the tube ends 208. In this regard, the tube bag 200 may be generally unrestrained from movement in lateral directions (e.g., directions non-parallel to the tube bag length 204) at locations between the tube ends 208 and which may allow the tube bag 200 to apply uniform compactive pressure across the width of the inside corner 304 and along other portions of the composite layup 400. By attaching the tube bag 200 to the tool 300 and to the bagging film 104 at the tube ends 208, and allowing for generally unrestrained lateral movement of the tube bag 200, the tube bag 200 may be freely to slip laterally relative to the bagging film 104 and/or relative to the composite layup 400/surface breather 124/release film 118 such that the tube bag 200 may freely apply compactive pressure to the composite layup 400 in the inside corner 304.

Although the figures illustrate the tube bag 200 being unattached to the bagging film 104 at locations between the tube ends 208, in some embodiments (not shown), the tube bag 200 may be attached to the bagging film 104 at one or more locations between the tube ends 208. Attachment of the tube bag 200 to the bagging film 104 at locations between the tube ends 208 may provide a means to stabilize the lateral location of the tube bag 200 so that the tube bag 200 remains positioned over the inside corner 304 when vacuum pressure 112 and/or autoclave pressure 116 is applied. For example, the tube bag 200 may be locally attached to the bagging film 104 using adhesive or other chemical or mechanical attachment means. The tube bag 200 may be attached to the bagging film 104 using an adhesive seam (not shown) between the tube ends 208, or the tube bag 200 may be attached to the bagging film 104 at periodic locations (not shown) between the tube ends 208. Although the tube bag 200 is show as being generally substantially continuous and hollow or open from one tube end 208 to the opposite tube end 208, the tube bag 200 may have one or more intermediate webs, ribs, strips, or other material that may extend at least partially across the width of the interior of the tube bag 200 and which may break up the length 204 of the tube bag interior into sections (not shown).

Figure 8:
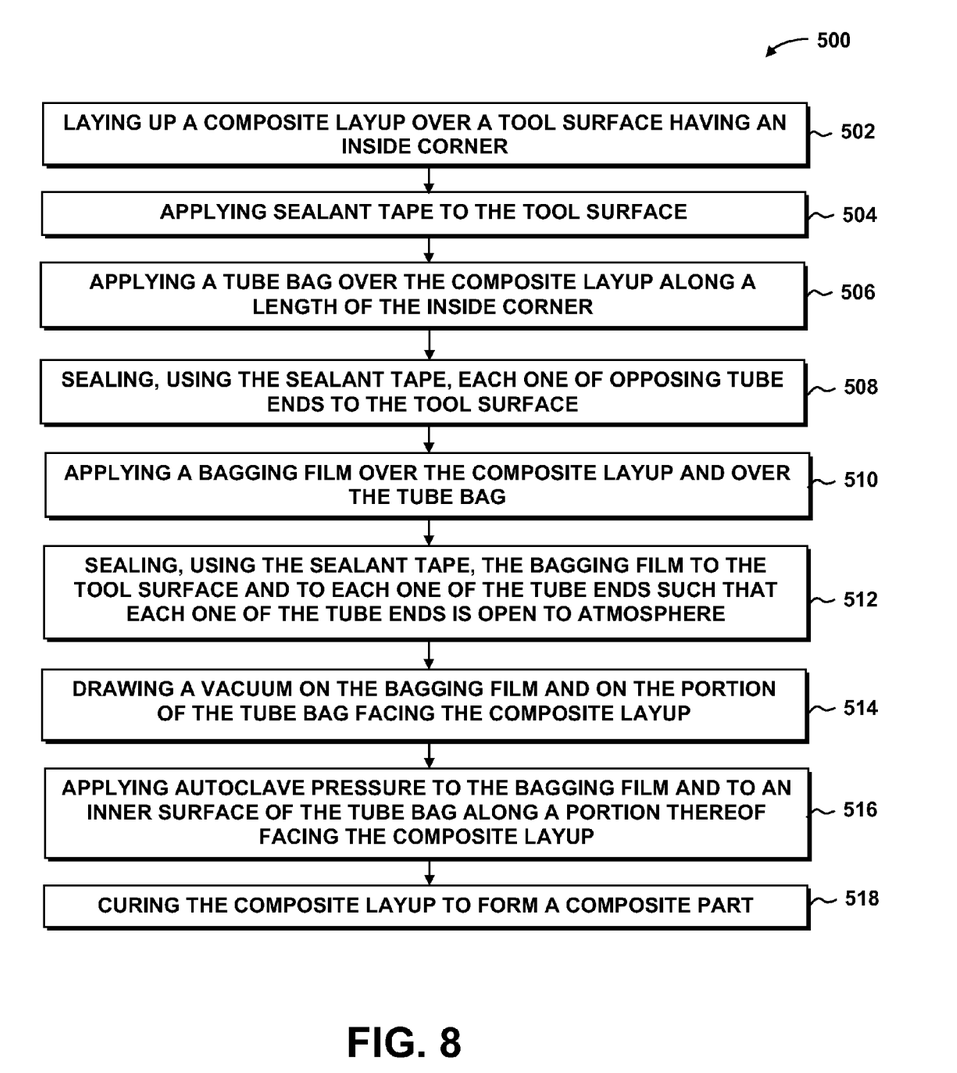
FIG. 8 is a flow chart including one or more operations that may be included in a method of a vacuum bagging a composite layup to form a composite part.

In FIG. 8, shown are one or more operations that may be included in a method 500 of a vacuum bagging a composite layup 400. The vacuum bagging process may be implemented using a vacuum bag assembly 102 as disclosed herein and which may include a tube bag 200 positioned underneath a bagging film 104 and applied over an inside corner 304 of a composite layup 400 on the tool 300. The vacuum bagging process may be implemented for debulking, consolidating, and/or curing a composite layup 400 into a final composite part 406.

Figure 9:
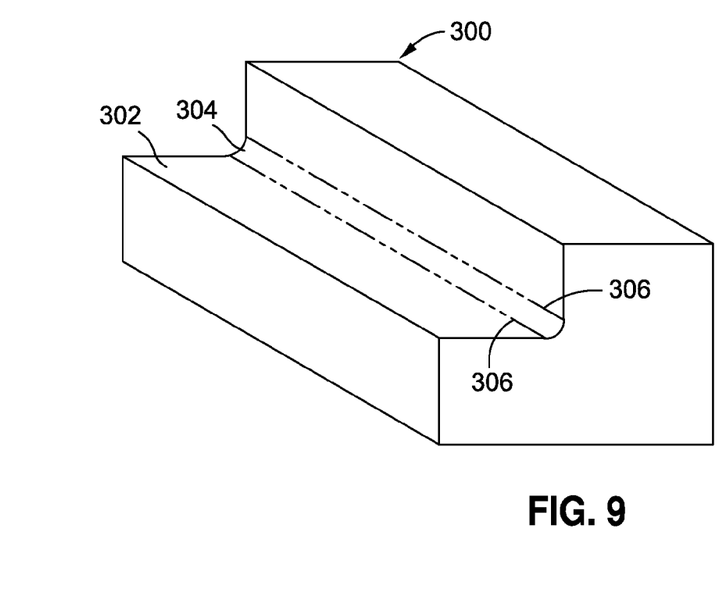
FIG. 9 is a perspective view of a tool having an inside corner.

In FIG. 9, the tool 300 may include one or more inside corners 304. As indicated above, an inside corner 304 may have any one of a variety of different sizes and shapes, and is not limited to a single-radius inside corner 304 as shown in the figures. The method 500 may include preparing the tool 300 for the composite layup 400 by cleaning the tool surfaces 302 of contaminants such as by solvent wiping. A release agent or release film (not shown) may be applied to the tool surfaces 302 to facilitate removal of the cured composite part.

Figure 10:
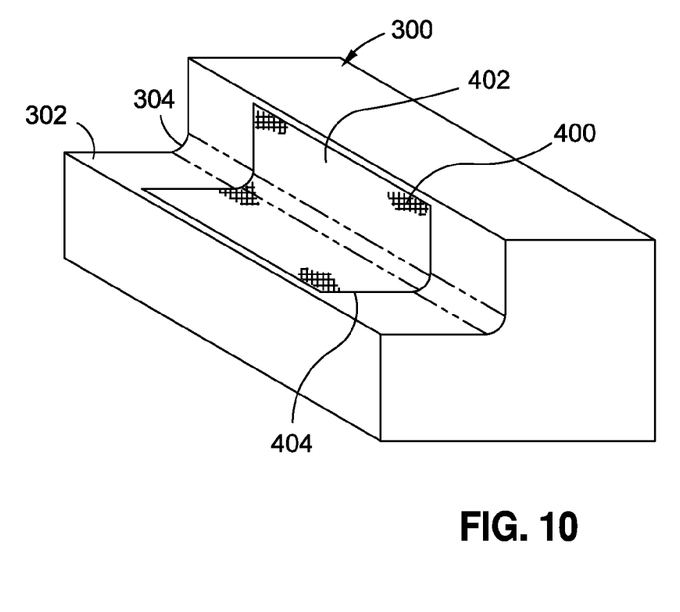
FIG. 10 is a perspective view of the tool having a composite layup applied to the tool surfaces.

In FIG. 10, Step 502 of the method 500 may include laying up a composite layup 400 on the tool 300 such that the composite layup 400 extends at least partially across an inside corner 304 or concave feature of the tool 300. As indicated above, the composite layup 400 may be formed of fiber-reinforced polymer matrix material. In an embodiment, the composite plies 402 may include thermosetting or thermoplastic prepreg plies, although the composite plies 402 may be formed of dry fibrous cloth that may be later infused with wet resin and cured. The method may include laying up plies 402 in a desired ply stacking sequence with desired fiber orientation angles.

Figure 11:
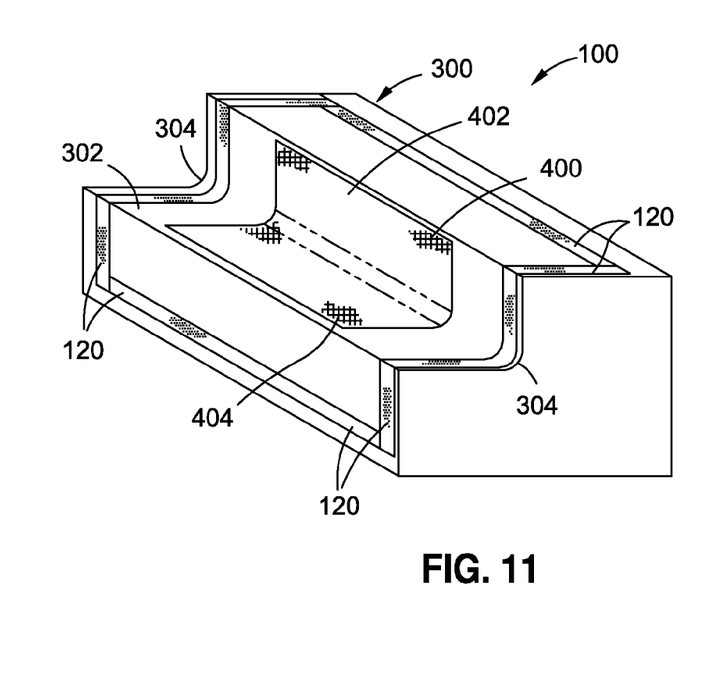
FIG. 11 is a perspective view of the tool having sealant tape applied to the tool surfaces.

In FIG. 11, Step 504 of the method 500 may include applying sealant tape 120 to the tool surfaces 302. For example, sealant tape 120 may be applied to the tool surfaces 302 at locations where the bagging film 104 and tube bag 200 may be sealed to the tool surfaces 302. The sealant tape 120 may be applied around the perimeter edges 404 of the composite layup 400. As indicated above, the sealant tape 120 may be provided as a rubber-based adhesive tape that may be generally tacky and may be used to form an airtight seal between the tool surfaces 302 and the bagging film 104 and to the tube bag 200.

Figure 12:
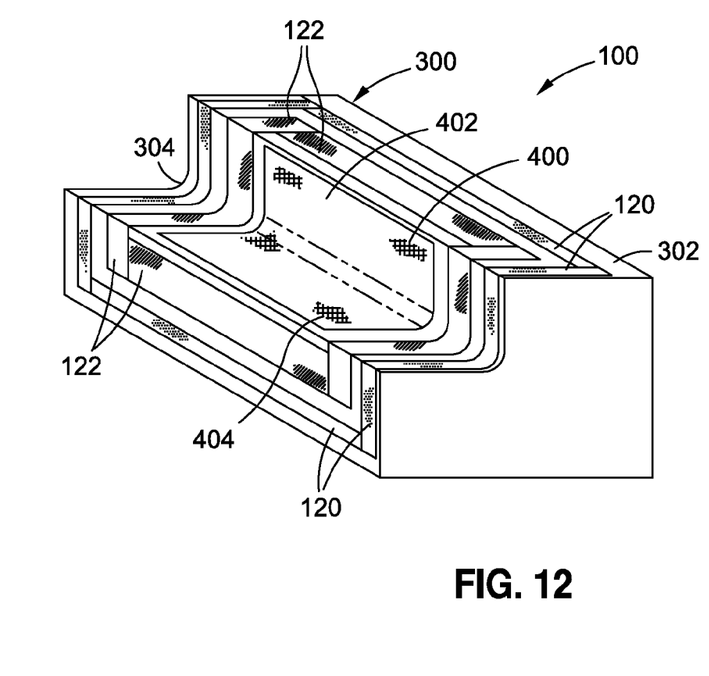
FIG. 12 is a perspective view of the tool having an edge breather applied to the tool surfaces around the perimeter edges of the composite layup.

In FIG. 12, in some examples, the method 500 may include applying edge breather 122 strips along the composite layup 400. The edge breather 122 strips may be positioned between the sealant tape 120 and the perimeter edges 404 of the composite layup 400. Although not shown in FIG. 13, the method 500 may include applying a release film 118 (FIG. 7) over the composite layup 400, followed by the application of a surface breather 124 (FIG. 7) over the release film 118, as described above.

Figures 13, 14:
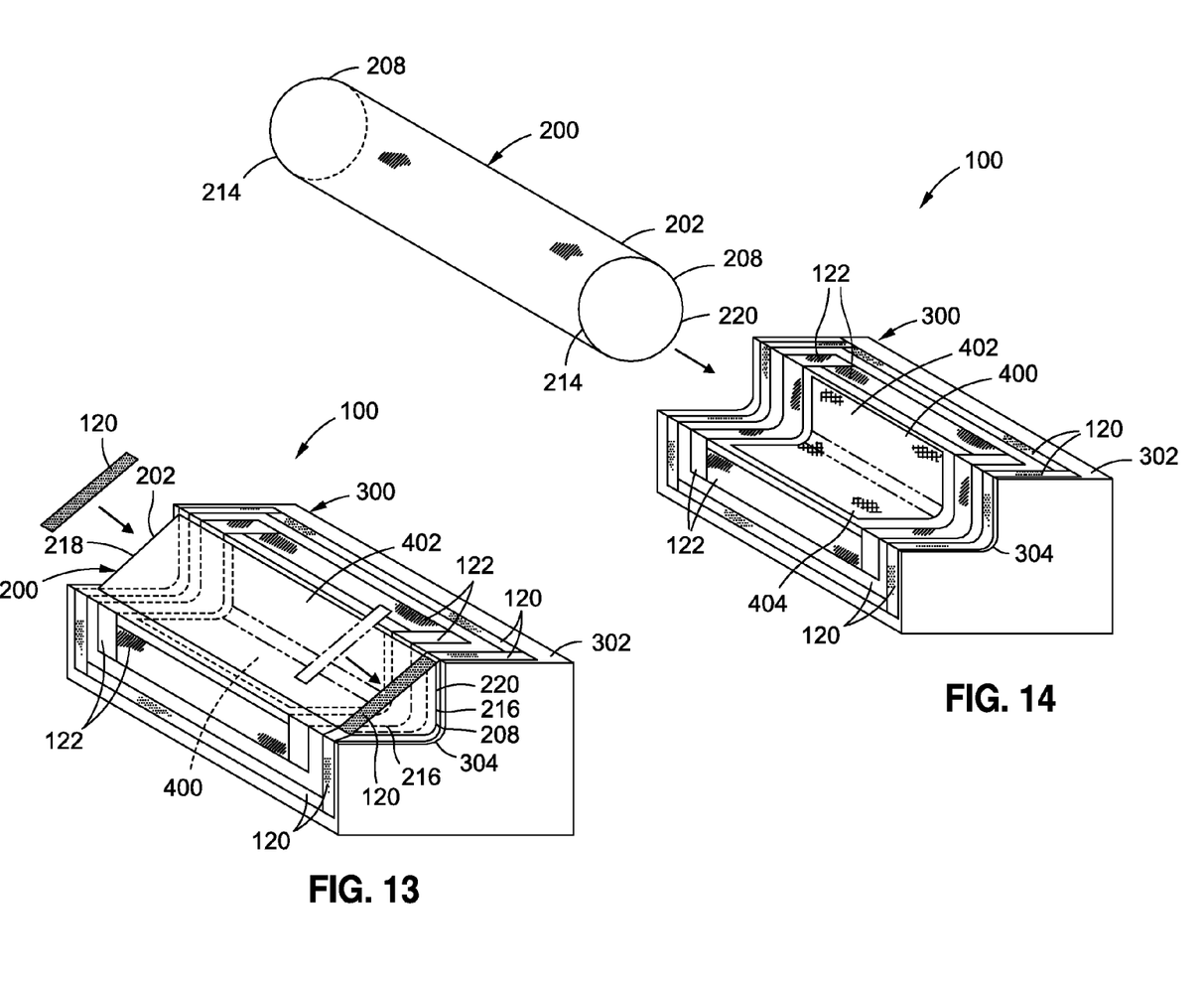
FIG. 13 is an exploded perspective view of a tube bag prior to mounting over the inside corner.
FIG. 14 is a perspective view of the bagging system after the opposing tube ends are sealed to opposing ends of the tool such as by using sealant tape.

In FIG. 13, Step 506 of the method 500 may include applying the tube bag 200 over the composite layup 400 which may be positioned underneath a surface breather 124 and/or release film 118. The tube bag 200 may be provided in a tube bag length 204 that extends substantially continuously along a length of the inside corner 304. In some examples, the tube bag 200 may be provided in a tube bag length 204 such that each one of opposing tube ends 208 extends beyond a perimeter edge 404 of the composite layup 400. The method may further include providing the tube bag 200 in a tube bag width 206 such that when vacuum pressure and/or autoclave pressure is applied, the tube bag 200 extends beyond at least one tangent 306 (FIG. 18) of the inside corner 304 of the tool surface 302 as shown in FIG. 18 and described below. As indicated above, the tube bag 200 may be formed as a separate component from the backing film and may have a hollow, closed cross-section 220 when the tube bag 200 is non-collapsed.

In FIGS. 13-14, Step 508 of the method 500 may include sealing each one of the tube ends 208 to the tool surface 302 by sealing a portion (e.g., a first portion 216) of a tube end perimeter edge 214 to the tool surface 302. For example, as was described above with regard to FIGS. 4-5, each one of the tube ends 208 may be sealed to the tool surfaces 302 ply by applying the outer surface 210 of the tube end perimeter edge 214 onto the sealant tape 120 previously installed on the tool 300. However, the method may include sealing the tube ends 208 to the tool 300 by other means, and is not limited to sealing the tube ends 208 to the tool 300 using sealant tape 120. For example, it is contemplated that the tube ends 208 may be sealed to the tool 300 using a mechanical sealing mechanism (not shown) or using other sealing means. The tube bag 200 between the tube ends 208 may be non-attached to the bagging film 104 and/or non-attached to any other portion of the vacuum bag assembly 102. In other embodiments, the tube bag 200 may be periodically attached to the bagging film 104 at one or more locations between the tube ends 208.

In FIG. 14, the method 500 may further include applying a strip of sealant tape 120 along the tube end perimeter edge 214 at each one of the tube ends 208. The sealant tape 120 may be applied to the outer surface 210 of the bagging film 104 on each one of the tube ends 208. The sealant tape 120 may be applied in a manner providing a continuation between the strips of sealant tape 120 installed on the tooling surfaces on opposite sides of the tube bag width 206, as shown in FIG. 14. In this regard, the sealant tape 120 is preferably applied in a manner providing continuous sealing at each one of the opposing edges of the tube bag width 206, with no gaps in the sealant tape 120. In an alternative embodiment not shown, the tube bag 200 may also be sealed to the bagging film 104 by heat-sealing the second portion 218 of the tube end perimeter edge 214 to the bagging film 104. In other embodiments, the tube bag 200 may be adhesively bonded to the bagging film 104, or sealed to the bagging film 104 by using any one of a variety of other sealing methods. Although the figures illustrate the tube bag 200 being sealed to the tool surfaces 302 prior to sealing the tube bag 200 to the bagging film 104, in some embodiments, the sequence may be reversed, and the tube bag 200 may be sealed to the bagging film 104 prior to sealing the tube bag 200 to the tool 300.

Figures 15, 16:
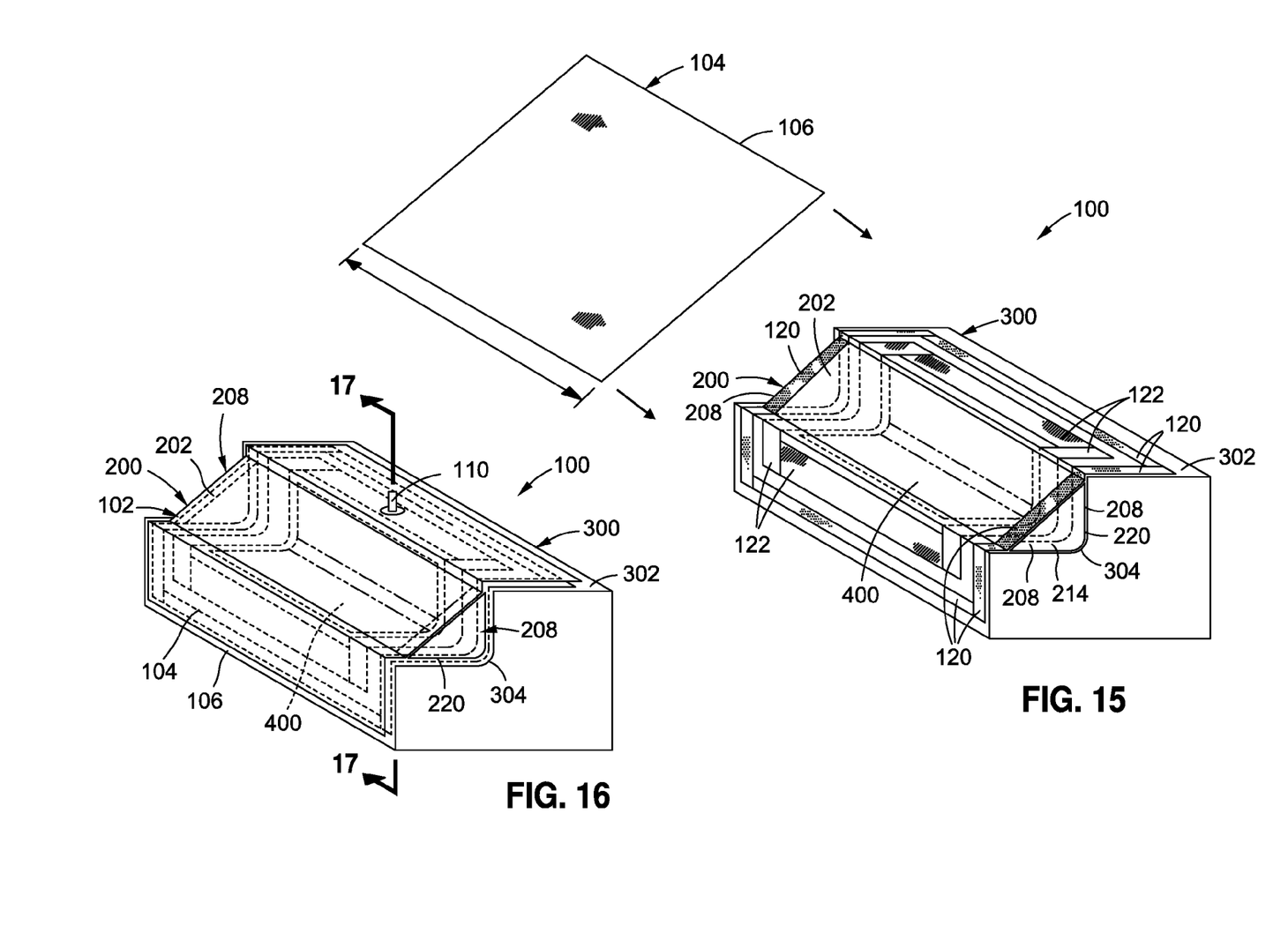
FIG. 15 is an exploded perspective view of a bagging film prior to mounting of the bagging film over the tube bag.
FIG. 16 is a perspective view of the bagging film mounted over the tube bag and sealed to the bag ends and sealed to the tool surfaces.

In FIG. 15, Step 510 of the method 500 may include applying a bagging film 104 over the composite layup 400 and over the tube bag 200. The bagging film 104 may be provided in a bagging film length 108 that may be substantially similar to the tube bag length 204. However, the bagging film length 108 may extend beyond the location where the bagging film 104 is sealed to the tube bag 200. In addition, the bagging film 104 width is preferably such that the bagging film 104 substantially covers the composite layup 400 without wrinkles in areas of the bagging film 104 that face the composite layup 400.

In FIG. 16, Step 512 of the method 500 may include sealing the bagging film 104 to the tool surface 302 and to each one of the tube ends 208. The bagging film 104 may be applied to the sealant tape 120 on the tool surfaces 302 and may be secured in a manner providing an airtight seal between the bagging film 104 and the tool surfaces 302. In addition, at each one of the tube ends 208, the bagging film 104 may be sealed to sealant tape 120 strips applied to the tube bag 200 as shown in FIG. 14. In this regard, the bagging film 104 may be sealed the tube bag 200 along a second portion 218 (e.g., a remaining portion) of the tube end perimeter edges 214 such that each one of the tube ends 208 is open to atmosphere and/or open to autoclave pressure 116.

In FIG. 17, shown is a sectional view of the bagging system 100 illustrating the hollow tube bag 200 generally covering the composite layup 400 in the region of the inside corner 304 and additionally covering the composite layup on the planar sections of the tool 300. The tube bag 200 is preferably provided in a tube bag width 206 that results in the tube bag 200 extending beyond each one of the tangents 306 of the inside corner 304 prior to the drawing of vacuum pressure 112 on the vacuum bag assembly 102. Advantageously, at locations between the tube ends 208, the tube bag 200 may be generally unrestrained against lateral movement or slippage relative to the composite layup 400 and relative to the bagging film 104.

In FIG. 18, Step 514 of the method 500 may include drawing a vacuum on the bagging film 104 and on the portion of the tube bag 200 facing the composite layup 400. The vacuum port 110 may be coupled to a vacuum source (not shown) which may be activated to draw a vacuum on the vacuum bag assembly 102. The drawing of the vacuum may result in the application of compactive pressure 114 on the composite layup 400 sandwiched between the tube bag 200 and the inside corner 304. In addition, compactive pressure 114 may also be applied to the portion of the composite layup 400 not covered by the tube bag 200 but covered by the bagging film 104.

Step 516 of the method 500 may include applying autoclave pressure 116 to the bagging film 104 such as while drawing a vacuum. Due to the open interior of the tube bag 200, autoclave pressure 116 may be applied to the inner surface 212 of the tube bag 200 facing the composite layup 400. Advantageously, the ability of the tube bag 200 to move or slip freely in a lateral direction relative to the composite layup 400 allows the tube bag 200 to extend into the inner corner and apply compactive pressure 114 on the inside corner 304 of the composite layup 400 under the vacuum and/or autoclave pressure 116. In this manner, the tube bag 200 may prevent, reduce, or eliminate bridging and resin-rich, out-of-tolerance thicknesses in the inside corners 304 of the composite layup 400.

Step 518 of the method 500 may include curing the composite layup 400 by applying heat. Heat may be applied while applying compactive pressure 114 to the composite layup 400. Heat may be applied to increase the temperature of the composite layup 400 to a cure temperature (e.g., for thermosetting resin) and/or a glass transition temperature (e.g., for thermoplastic resin) of the composite plies 402. However, as indicated above, the vacuum bag assembly 102 may also be used in a wet layup process wherein resin may be infused or drawn into a composite layup 400 formed of plies of dry fibrous material, after which compactive pressure 114 and heat may be applied to cure and/or solidify the resin.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A vacuum bag assembly, comprising:
   a bagging film having a bagging film length and configured to be positioned over a composite layup and sealed to a tool surface having an inside corner;
   a tube bag having opposing tube ends and a tube bag length and configured to be positioned between the bagging film and a portion of the composite layup along a length of the inside corner; and
   each one of the tube ends being configured to be sealed to the tool surface along a first portion of a tube end perimeter edge and being sealed to the bagging film along a second portion of the tube end perimeter edge such that each one of the tube ends is open to atmosphere.

2. The vacuum bag assembly of claim 1, wherein:
   the tube bag being non-attached to the bagging film at locations between the tube ends.

3. The vacuum bag assembly of claim 1, wherein:
the tube bag is formed as a separate component from the bagging film.

4. The vacuum bag assembly of claim 1, wherein:
the tube bag is sealed to the bagging film with sealant tape.

5. The vacuum bag assembly of claim 1, wherein:
the tube bag has a tube bag width such that when a vacuum is drawn on the bagging film when sealed to the tool surface, the tube bag width extends beyond at least one tangent of the inside corner for at least one location along a length of the inside corner.

6. The vacuum bag assembly of claim 1, wherein:
at least one of the tube ends extends beyond a perimeter edge of the composite layup.

7. The vacuum bag assembly of claim 1, wherein:
the bagging film and the tube bag are formed of a same material.

8. The vacuum bag assembly of claim 1, wherein:
the bagging film and the tube bag are formed of polyamide film.

9. The vacuum bag assembly of claim 1, further comprising:
a surface breather covering the composite layup; and
the tube bag and the bagging film being applied over the surface breather.

10. The vacuum bag assembly of claim 1, wherein:
a vacuum port mounted to the bagging film.

11. A bagging system for vacuum bagging a composite layup, comprising:
a tool having tool surfaces and an inside corner;
a vacuum bag assembly, including:
a bagging film having a bagging film length and configured to be positioned over a composite layup and sealed to the tool surfaces;
a tube bag having opposing tube ends and a tube bag length and configured to be positioned between the bagging film and a portion of the composite layup along a length of the inside corner; and
each one of the tube ends being sealed to the tool surface along a first portion of a tube end perimeter edge and being sealed to the bagging film along a second portion of the tube end perimeter edge such that each one of the tube ends is open to atmosphere.

12. A method of vacuum bagging a composite layup, comprising the steps of:
applying a tube bag over a composite layup along a length of an inside corner of a tool surface over which the composite layup is laid up, the tube bag having opposing tube ends, each one of the tube ends having a tube end perimeter edge;
sealing each one of the opposing tube ends to the tool surface by sealing a first portion of the tube end perimeter edge of each one of the opposing tube ends to the tool surface;
applying a bagging film over the composite layup and over the tube bag such that the tube bag is positioned between the bagging film and a portion of the composite layup along a length of the inside corner; and
sealing the bagging film to the tool surface and to each one of the opposing tube ends along a second portion of the tube end perimeter edge of each one of the opposing tube ends such that each one of the opposing tube ends is open to atmosphere.

13. The method of claim 12, further comprising:
drawing a vacuum on the bagging film and on the portion of the tube bag facing the composite layup; and
applying compactive pressure on the composite layup sandwiched between the tube bag and the inside corner.

14. The method of claim 12, further comprising:
applying autoclave pressure to the bagging film and to an inner surface of the tube bag along a portion facing the composite layup.

15. The method of claim 12, wherein:
the step of sealing each one of the opposing tube ends of the tube bag to the tool surface is performed prior to sealing the tube bag to the bagging film.

16. The method of claim 12, wherein the step of sealing each one of the opposing tube ends of the tube bag to the tool surface comprises:
applying sealant tape to the tool surface; and
applying an outer surface of the tube end perimeter edge to the sealant tape.

17. The method of claim 12, further comprising:
providing the tube bag in a tube bag width such that when the vacuum is drawn, the tube bag extends beyond at least one tangent of the inside corner of the tool surface.

18. The method of claim 12, further comprising:
laying up one or more plies of fiber-reinforced polymer matrix material on the tool surface to form the composite layup.

19. The method of claim 18, wherein the step of laying up the composite layup comprises:
laying up plies of pre-impregnated fiber-reinforced polymer matrix material.

20. A vacuum bag assembly comprising:
a composite layup comprising one or more composite plies laid up on a tool surface of a tool having an inside corner;
a bagging film having a bagging film length positioned over the composite layup and sealed to the tool surface having an inside corner;
a tube bag having opposing tube ends and a tube bag length positioned between the bagging film and a portion of the composite layup along a length of the inside corner; and
each one of the tube ends being sealed to the tool surface along a first portion of a tube end perimeter edge and being sealed to the bagging film along a second portion of the tube end perimeter edge such that each one of the tube ends is open to atmosphere.

* * * * *